United States Patent
Prabhu

(10) Patent No.: US 10,389,730 B2
(45) Date of Patent: Aug. 20, 2019

(54) VISITOR ACCESS MANAGEMENT

(71) Applicant: Avaya Inc., Santa Clara, CA (US)

(72) Inventor: Atul Prabhu, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 179 days.

(21) Appl. No.: 15/145,270

(22) Filed: May 3, 2016

(65) Prior Publication Data

US 2017/0324751 A1 Nov. 9, 2017

(51) Int. Cl.
*H04L 29/06* (2006.01)
*H04L 29/08* (2006.01)
*G06K 19/06* (2006.01)
*G06C 9/00* (2006.01)
*G07C 9/00* (2006.01)
*H04W 12/06* (2009.01)

(52) U.S. Cl.
CPC ........ *H04L 63/107* (2013.01); *G07C 9/00039* (2013.01); *G07C 9/00103* (2013.01); *G07C 9/00134* (2013.01); *H04L 63/0838* (2013.01); *H04L 63/20* (2013.01); *H04L 67/24* (2013.01); *H04W 12/06* (2013.01); *G07C 9/00015* (2013.01)

(58) Field of Classification Search
USPC ........................................................ 726/1–5
See application file for complete search history.

(56) References Cited

U.S. PATENT DOCUMENTS

| | | | | |
|---|---|---|---|---|
| 6,850,861 B1 * | 2/2005 | Faiola | ............... | G01K 1/026 374/E1.005 |
| 9,038,157 B1 * | 5/2015 | Santiago, Jr. | ........... | G06F 21/34 726/9 |
| 2008/0046984 A1 * | 2/2008 | Bohmer | .............. | H04L 63/0853 726/5 |
| 2012/0271717 A1 * | 10/2012 | Postrel | .................. | G06Q 30/02 705/14.58 |
| 2013/0173915 A1 * | 7/2013 | Haulund | ............... | H04L 9/3226 713/159 |
| 2013/0201000 A1 * | 8/2013 | Solomon | .................. | G05B 1/01 340/5.83 |
| 2016/0219039 A1 * | 7/2016 | Houthooft | ............. | H04L 9/3215 |
| 2017/0237565 A1 * | 8/2017 | Rommel | ................. | G06F 19/30 713/171 |

* cited by examiner

*Primary Examiner* — Jahangir Kabir

(57) ABSTRACT

Methods, systems and computer readable media for managing access of visitors to a facility as described herein can provide a seamless process by which a visitor of an organization may be granted access not only to the physical facility but also automatically granted network access (e.g., granted access to an enterprise network) with limited or no external human touch points and without compromising security.

20 Claims, 4 Drawing Sheets

VISITOR ACCESS MANAGEMENT

TECHNICAL FIELD

Embodiments relate generally to access management, and more particularly, to methods, systems and computer readable media for managing both physical access of visitors to a facility and electronic access to a computer network.

BACKGROUND

Inviting visitors to a facility for scheduled events (e.g., meetings, discussions, demonstrations, presentations, etc.) can be a common occurrence for an organization. Many times, when a visitor (or guest) arrives for a scheduled meeting, a representative from the organization (e.g., an inviting team member or a building security officer) is present at a reception area. The representative from the organization may validate the identification of the visitor (e.g., validate a driver's license, passport, photo identification card, etc.) and then grant (or deny) the visitor physical access to the building. Granting physical access can include issuing the visitor a temporary visitor badge of the organization (or facility). Subsequently, the visitor may interact with reception area staff (or a representative from an Information Technology (IT) department) to obtain temporary visitor credentials for network access.

Having so many human touch points (e.g., security guard, employee from inviting team, help desk or IT staff, etc.) merely to provide physical and/or network access to the organization or enterprise can be cumbersome and costly (e.g., both from a time and an effort perspective) and may also leave an undesirable impression on the visitor. Further, as a workflow for managing access of visitors to a facility may provide the first impression of the organization in the visitor's mind, this impression could play a role in future decision making about the organization (e.g., whether the visitor chooses to do business with the organization, wishes to become part of the organization, etc.).

Some existing visitor access management solutions may not unify the physical access and network access into one workflow, rather may keep these two forms of access unrelated, and thus requiring two separate processes that may consume time and other resources.

Embodiments were conceived in light of the above mentioned needs, problems and/or limitations, among other things.

SUMMARY

In general, some implementations can provide a seamless and "smart" process by which a visitor of an organization may be granted access not only to the physical facility but also automatically granted network access (e.g., granted access to an enterprise network) with limited or no external human touch points and without compromising security.

One or more embodiments can include methods, systems and computer readable media for managing access of visitors to a facility. In some implementations, a method can include providing an electronic invitation communication to a visitor device, the electronic invitation communication including a computer readable indicium, and determining physical presence of the visitor device by sensing, at a computer readable indicium sensor system, the computer readable indicium presented by the visitor device. The method can also include validating the computer readable indicium, and, when the computer readable indicium is valid, transmitting an authentication token to the visitor device.

The method can further include receiving, at a visitor input device, a user input including an authentication token, and, when the authentication token in the received user input is valid, creating a visitor account. The method can also include providing a network connection from a computer network to the visitor device, and causing a captive portal to be displayed on the user device.

The method can further include automatically searching for an electronically stored version of the computer readable indicium on the visitor device, and, when the electronically stored version of the computer readable indicium is found on the visitor device, performing a login process from the captive portal to a policy server to login the visitor device to the computer network and grant the visitor access to the computer network.

The computer readable indicium can include one of a quick response (QR) code, a two-dimensional barcode, and/or a three-dimensional barcode. Validating the computer readable indicium can include determining that the computer readable indicium is being sensed at a date and time within a period of validity indicated in the electronic invitation communication. The authentication token can include a one time password.

The method can also include, when the electronically stored version of the computer readable indicium is not found on the visitor device, receiving a manually provided indication of a location of the electronically stored version of the computer readable indicium on the visitor device. The method can further include providing a second level authentication request to the visitor device, receiving second level authentication information from the visitor device, and granting access to the network based on the second level authentication.

Some implementations can include a system comprising one or more processors coupled to a nontransitory computer readable medium having stored thereon on software instructions that, when executed by the one or more processors, cause to perform operations. The operations can include providing an electronic invitation communication to a visitor device, the electronic invitation communication including a computer readable indicium, and determining physical presence of the visitor device by sensing, at a computer readable indicium sensor system, the computer readable indicium presented by the visitor device.

The operations can also include validating the computer readable indicium, and, when the computer readable indicium is valid, transmitting an authentication token to the visitor device. The operations can further include receiving, at a visitor input device, a user input including an authentication token, and, when the authentication token in the received user input is valid, creating a visitor account.

The operations can also include providing a network connection from a computer network to the visitor device, and causing a captive portal to be displayed on the user device. The operations can further include automatically searching for an electronically stored version of the computer readable indicium on the visitor device, and, when the electronically stored version of the computer readable indicium is found on the visitor device, performing a login process from the captive portal to a policy server to login the visitor device to the computer network and grant the visitor access to the computer network.

The computer readable indicium can include one of a quick response (QR) code, a two-dimensional barcode, and/or a three-dimensional barcode. Validating the computer readable indicium can include determining that the computer readable indicium is being sensed at a date and time within a period of validity indicated in the electronic invitation communication.

The authentication token can include a one time password. The operations can also include, when the electronically stored version of the computer readable indicium is not found on the visitor device, receiving a manually provided indication of a location of the electronically stored version of the computer readable indicium on the visitor device.

The operations can further include providing a second level authentication request to the visitor device, receiving second level authentication information from the visitor device, and granting access to the network based on the second level authentication.

Some implementations can include a nontransitory computer readable medium having stored thereon software instructions that, when executed by one or more processors, cause the one or more processors to perform operations. The operations can include providing an electronic invitation communication to a visitor device, the electronic invitation communication including a computer readable indicium, and determining physical presence of the visitor device by sensing, at a computer readable indicium sensor system, the computer readable indicium presented by the visitor device.

The operations can also include validating the computer readable indicium, and, when the computer readable indicium is valid, transmitting an authentication token to the visitor device. The operations can further include receiving, at a visitor input device, a user input including an authentication token, and, when the authentication token in the received user input is valid, creating a visitor account.

The operations can also include providing a network connection from a computer network to the visitor device, and causing a captive portal to be displayed on the user device. The operations can further include automatically searching for an electronically stored version of the computer readable indicium on the visitor device, and, when the electronically stored version of the computer readable indicium is found on the visitor device, performing a login process from the captive portal to a policy server to login the visitor device to the computer network and grant the visitor access to the computer network.

The computer readable indicium can include one of a quick response (QR) code, a two-dimensional barcode, and/or a three-dimensional barcode. Validating the computer readable indicium can include determining that the computer readable indicium is being sensed at a date and time within a period of validity indicated in the electronic invitation communication.

The authentication token can include a one time password. The operations can also include, when the electronically stored version of the computer readable indicium is not found on the visitor device, receiving a manually provided indication of a location of the electronically stored version of the computer readable indicium on the visitor device.

The operations can further include providing a second level authentication request to the visitor device, receiving second level authentication information from the visitor device, and granting access to the network based on the second level authentication.

DETAILED DESCRIPTION

Figure 1:
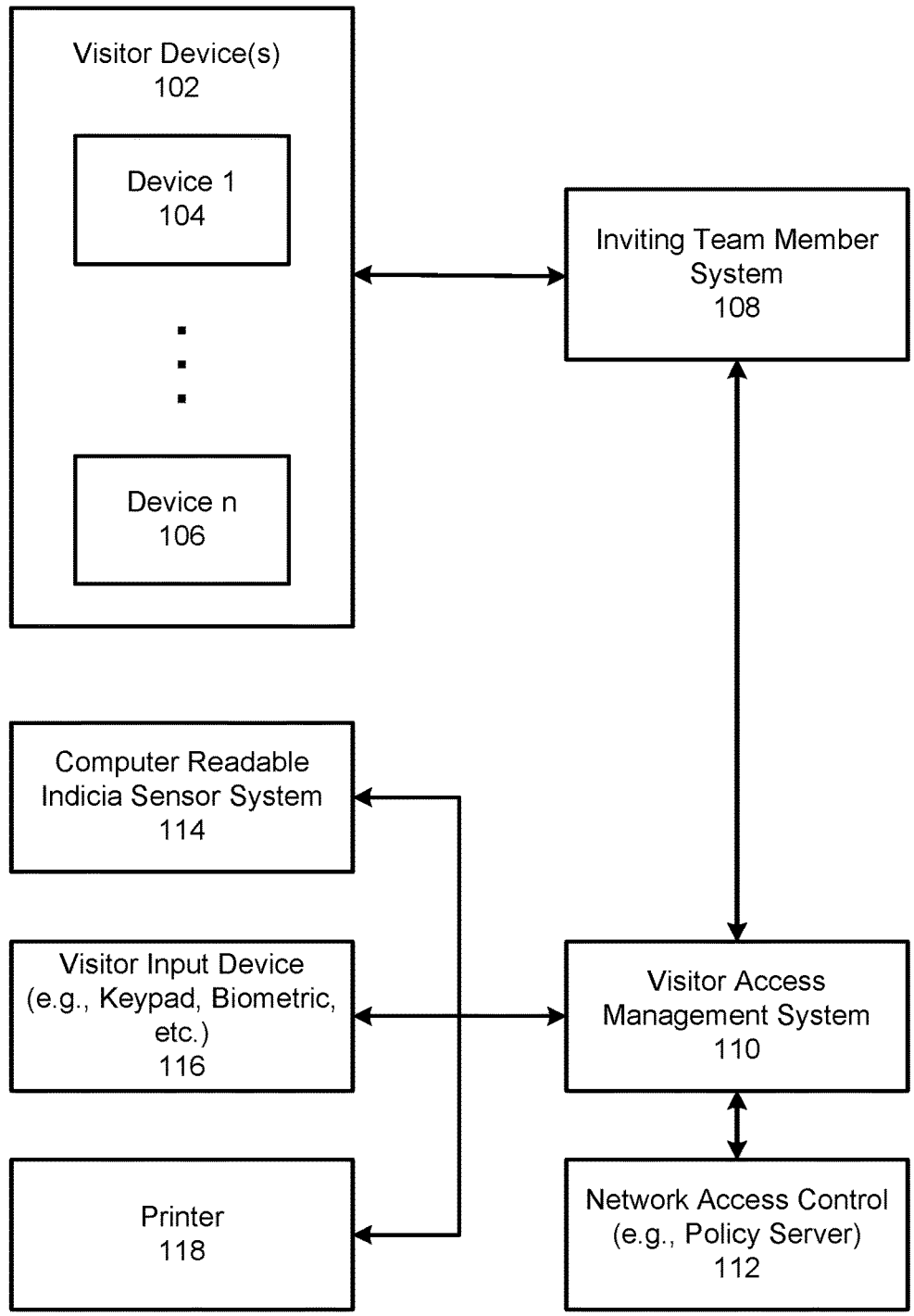
FIG. 1 is a diagram of an example visitor access management system environment in accordance with some implementations.

In some conventional visitor access management processes, when a visitor arrives at an organization for a scheduled meeting or the like, a typical workflow could proceed as follows:

1) The visitor reports to security, provides the various identification documents and collects a temporary badge that permits access to a facility of the organization.

2) The visitor contacts the reception area staff and/or inviting employee for temporary credentials in order to connect to the network. If the visitor contacts the reception area staff, the reception area staff may contact the inviting employee for confirmation that the visitor should be permitted network access and then create a guest account to permit the visitor to have network access. Alternately, the reception area staff/inviting employee may call an Information Technology (IT) staff member and request that the IT department create a temporary account for the visitor.

Some organizations may provide a self-registration option for visitors to create network accounts, but in some (if not most) cases such a system may still require approval from a sponsor (e.g., inviting employee of the company) before the account can be activated. The visitor waits for this account to be created and/or activated to be able to access the network. The validity time period of the account could be an arbitrary value (e.g., 15 min. to 60 min.) and may not be linked to the period of the visitor's stay at the facility.

In conventional visitor access management processes, a visitor may need several interactions with employees/personnel to obtain physical and network access. The first check point may be building security where the ID proof is checked to determine if the visitor is actually who she/he claims to be. This requires manually going through the ID proof (e.g., company issued ID card or government issued ID card) and ensuring authenticity.

Following ID confirmation, a temporary badge may need to be issued, which may require several details from the visitor that may be manually entered either in a paper-based visitor log or a computerized visitor log system. This process of physical verification of documents and manually entering visitor details in the system can be a time consuming and inefficient way of visitor access management. However, given the importance of security and audit, some process is needed and even time consuming process steps may not be skipped.

After swiping (or scanning or presenting) a temporary badge, the visitor may gain access to a facility. In order to access the organization's network, the visitor may need to obtain temporary credentials. Typically, the visitor would contact the reception or front desk staff or an administrator in an IT department. Again, this process can involve manually collecting visitor information and may also be influenced by availability of needed personnel. Further, when several visitors are visiting an organization, this sequential process may become a bottleneck.

Some enterprise may also have an option of guest self registration, but even in the self registration processes, a visitor network access account may need to be approved by a sponsor (e.g., inviting employee, etc.) to reduce or prevent misuse of the self registration process. Even in a self regulation process, if the employee needed for approval is occupied with another task, the approval, and network access, may be delayed.

In many instances, a conventional visitor access management process can include several aspects of human involvement, which can result in delayed processing and overall delay in providing a visitor with physical and/or network access. This delay may cause a negative perception buildup in the visitor toward the host organization and could play a role in the eventual decision making.

Typical visitor management solutions consider visitor physical access and network access as two separate, unrelated workflows and make no effort to unify them. Each of these workflows may also include several human touch points and hence this process can become time consuming and cumbersome.

With the solution described herein, visitor access management includes unifying physical access and network access for a visitor into a single workflow to provide a seamless and smart workflow to eliminate most or all of the human touch points without compromising security.

Some implementations were conceived to address some of the problems and limitations of conventional visitor access management processes mentioned above.

In general, in some implementations the machine readable indicium (e.g., QR code) generation happens with an external application (which could be potentially integrated with an email client or system, such as Outlook). The invitation and the QR code generation could be taken as part of the initial visitor invitation flow. The One Time Password (OTP) is generated once the visitor scans the QR code (at the company premise) on the QR reader. Once the QR reader validates the QR code, the QR reader interacts with an Authentication System or any external system which hosts the OTP implementation to generate the OTP and send it to the visitor's registered email address.

FIG. 1 shows an example visitor access system environment in accordance with some implementations. The environment 100 includes a group of one or more visitor devices 102 including individual devices (104, 106), an inviting team member system 108, a visitor access management system 110, a network access control system 112 (e.g., a policy server), one or more computer readable indicium sensor systems 114, one or more visitor input devices 116, and a printer 118.

The visitor access management system 110 in accordance with the present disclosure can include reducing some or all of the manual interactions and/or delays associated with convention visitor access protocols or processes. For example, whenever a scheduled meeting with a visitor is planned, some implementations can include sending a meeting invite via an electronic communications system to block a date/time period on the respective computerized calendars of invitees. The invite is typically sent from an inviting team member system (e.g., 108) to the official email address of the visitor(s) (e.g., to a business or organization email address).

In some implementations, along with the meeting invite, each individual visitor invitee could also be sent a machine readable indicium (e.g., a Quick Response code (QR code), bar code or the like). The machine readable indicium could be encoded to contain (or reference a source with) one or more of the following information items:

Email: peter.smith@abc.com
First Name: Peter
Second Name: Smith
Start Time: 02/03/16 (10 AM)
End Time: 02/03/16 (12 PM)
Authentication token: AAx562TPJE&88

The start time corresponds to the meeting start time and the end time corresponds to the meeting end time. The authentication token can include a private token used for validating the machine readable indicium and prevent visitors from cloning the machine readable indicium.

Each visitor invitee can be given instructions to download the machine readable indicium in their device (e.g., smart phone) as part of the meeting invite instructions. When the visitor arrives at a reception area (or lobby), a machine readable indicium sensing system 114 (e.g., a QR code reader) can be provided to permit the visitor to scan the QR code (or other machine readable indicium) as displayed on the visitor's smartphone (104 and/or 106).

Upon successfully scanning and validating the QR code (e.g., using the authentication token) from the visitor's smartphone, the QR reader 114 can request that a one time password (OTP) be entered by the visitor. Meanwhile, in the background the QR reader can generate an OTP message and send the message to the visitor's registered email (e.g., the email address extracted from the QR code) for confirmation. Thus providing a form of two factor authentication to help ensure that only the genuine visitor is attempting access and not some imposter. In addition to the OTP, the system can send an image and request the user to select a description of the image when entering the OTP. The image description selection can be validated as an additional security measure.

The visitor receives the OTP in his/her official email mailbox and can enter the OTP in the QR reader 114 (or a visitor input device, e.g. 116). Upon successful processing of the OTP, a visitor pass/badge is automatically printed (e.g., on printer 118) and made available to the visitor. This automatic two factor authentication system can help replace the manual verification of the ID card of the visitor by a security guard, but at the same time help ensure that only a genuine visitor is allowed access.

After granting physical access to the visitor, the QR code reader system 114 automatically provisions the visitor's network account. Information such as email, first name, last name, start time and end time can be extracted from the QR code and passed to an internal Visitor Management solution (e.g., via REST APIs) to get the visitor's network account provisioned.

From the visitor's perspective, this process is transparent and happens automatically in the background without any intervention from the visitor and without the visitor having to manually approach Front Desk or IT Administrative staff.

After the visitor enters the facility, the visitor's smartphone can automatically connect to the guest network and a captive portal landing page appears. The captive portal automatically tries to discover the QR code image on the visitor's smartphone. The standard download folders can be searched to identify the QR code image.

If the captive portal is able to discover the QR code then it automatically parses it and gets the user information required for logging in. If the captive portal is unable to find the QR code in the download section then a provision would be made available to upload the QR code.

For additional security, the OTP generated during the first access (or a newly generated OTP) could be asked as an additional input before granting the visitor network access.

Figure 2A:
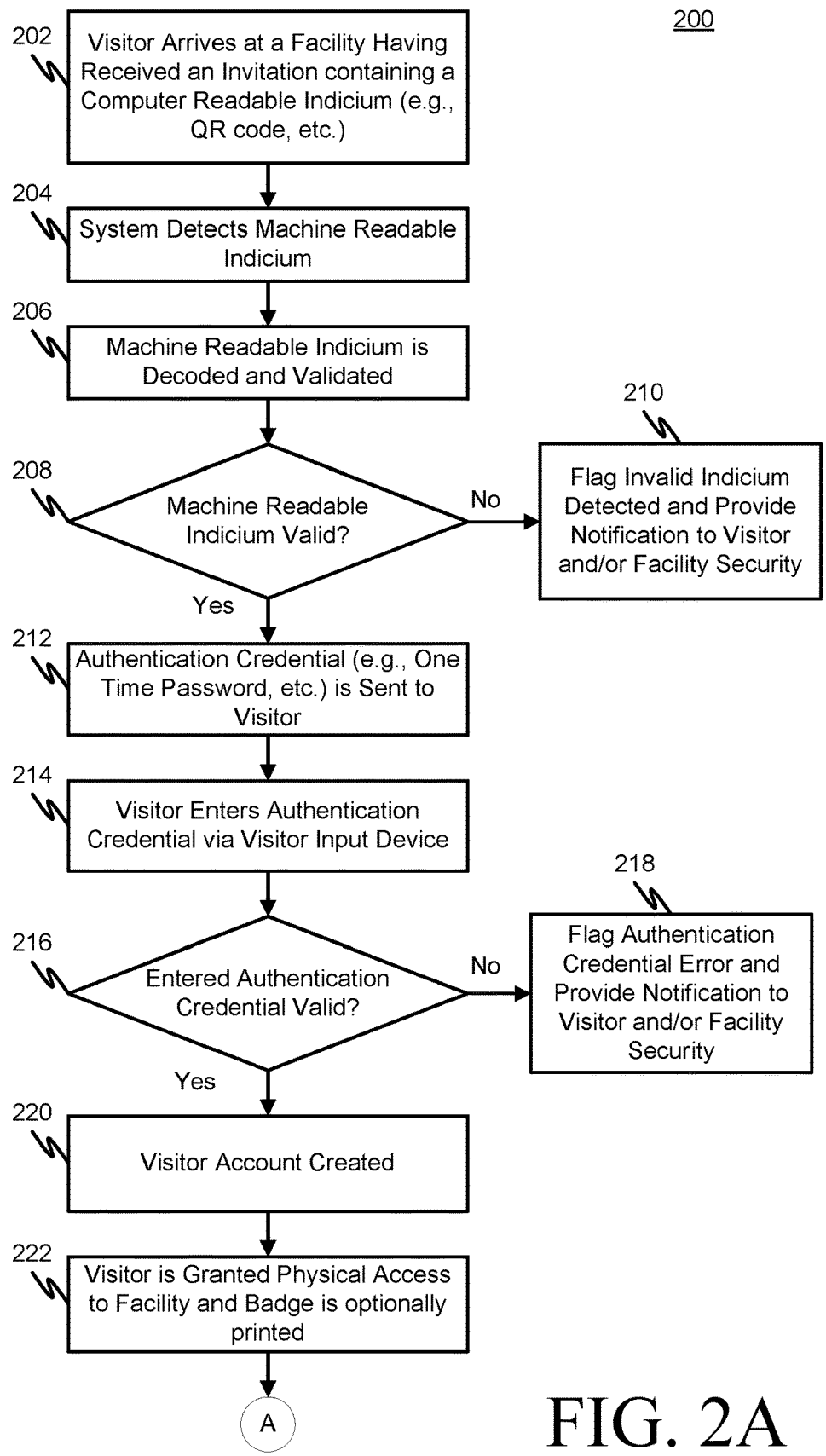
FIGS. 2A and 2B are a flowchart showing an example method for visitor access management in accordance with some implementations.
Figure 2B:
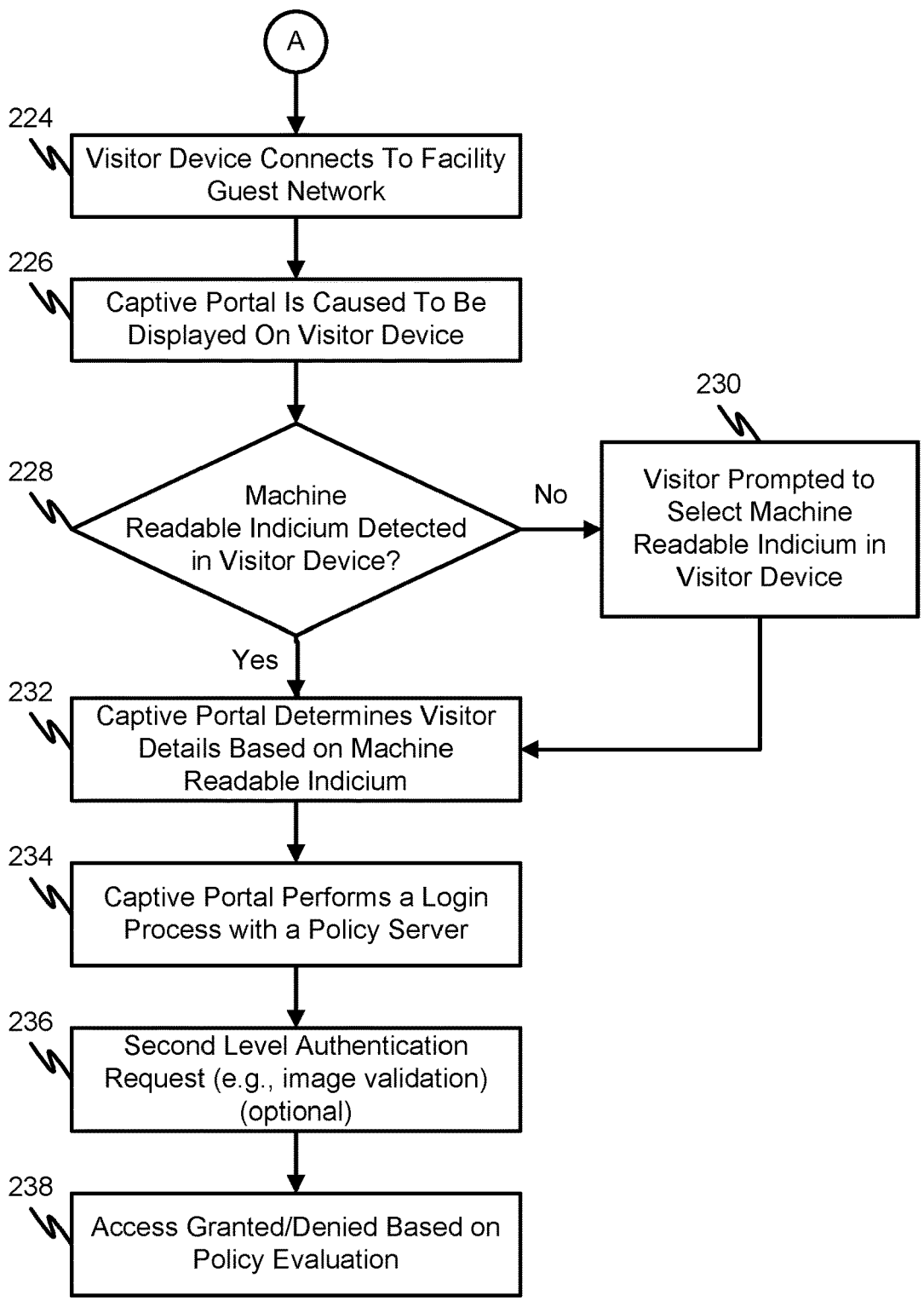

FIGS. 2A and 2B show a flowchart of an example method for managing visitor access. The method begins at 202, where a visitor arrives at a host facility. The visitor has received an electronic invitation communication containing a computer readable indicium that can include an encoded version of one or more of the information items described above. Processing continues to 204.

At 204, a system detects the machine readable indicium (e.g., via a sensor system 114). Processing continues to 206.

At 206, the machine readable indicium is decoded and validated. The decoding can be performed in known ways depending on the type of computer readable indicium is being used. The validating can include comparing an authentication token decoded form the machine readable indicium with one entered by the visitor and/or retrieved from a network access control system (e.g., 112). The validating can also include determining that the date and time of computer readable indicium detection is one a date and within a time period specified in the meeting invitation. Processing continues to 208.

At 208, it is determined whether the machine readable indicium is valid. For example, an authentication (or trust) token can be encoded in the machine readable indicium. The trust Token present in the QR code can be automatically verified by the QR reader (which could interact with token implementation system) to verify the QR code. This information can be parsed from the QR code automatically (e.g., as part of the initial scan) and a user may not be involved in providing this information. The user manually provides the OTP, image name or description, or the like. All the other information is automatically deduced from the QR code. If the machine readable indicium is not valid, processing continues to 210. Otherwise processing continues to 212.

At 210, the system can generate a notification (or flag) for an invalid computer readable indicium being detected. The notification could be provided to the visitor, to the inviting employee, organization security, and/or an IT administrator. Processing may repeat back to 204.

At 212, an authentication token (e.g., a one time password) is sent to the email address of the visitor. Processing continues to 214.

At 214, the visitor enters the authentication credential, such as a one-time password (OTP) or the like (e.g., via 114 or 116). Processing continues to 216.

At 216, the system determines whether the entered authentication token is valid. If the token is not valid, processing continues to 218. Otherwise, processing continues to 220.

At 218, the system can generate a notification (or flag) for an invalid authentication token being received. The notification could be provided to the visitor, to the inviting employee, organization security, and/or an IT administrator. Processing may repeat back to 212.

At 220, a network account is automatically created for the visitor using information (e.g., name, email, etc.) obtained from the machine readable indicium. Processing continues to 222.

At 222, the visitor is granted physical access to the facility and a badge is optionally printed. Processing continues to 224.

At 224, the visitor device is automatically connected to the facility network. Processing continues to 226.

At 226, a captive portal login page is caused to be displayed on the visitor device. Captive portal display can be automatic or in response to a user opening a browser or the like to seek access to a network (e.g., Internet). The captive portal can include an internal application provided by the mobile phones operating system. When a user opens a browser and tries to access a webpage, the captive portal login page can be displayed. Processing continues to 228.

At 228, the system determines whether an electronically stored machine readable indicium is found automatically on the visitor device. For example, in some implementations, the captive portal could include logic to scan the target device for the QR code. Automatic scripts could be invoked on successfully loading the Captive Portal Login page which does the same. A custom app could also reside within the Captive Portal implementation which could do this scanning and parsing. If not, processing continues to 230. Otherwise, processing continues to 232.

At 230, the visitor can be prompted to manually select the machine readable indicium file in the visitor's mobile device.

At 232, the captive portal determines visitor details based on machine readable indicium. Processing continues to 234.

At 234, the captive portal performs a login process for the visitor with a network policy server. Processing continues to 236.

At 236, an optional second level authentication request is made to the visitor. For example, the visitor could be requested to enter the one time password again or enter a new one time password sent to the visitor device. Processing continues to 238.

At 238, the visitor is granted (or denied) access to the network based on a policy evaluation of the authentication information. It will be appreciated that 202-238 can be repeated in whole or in part.

Figure 3:
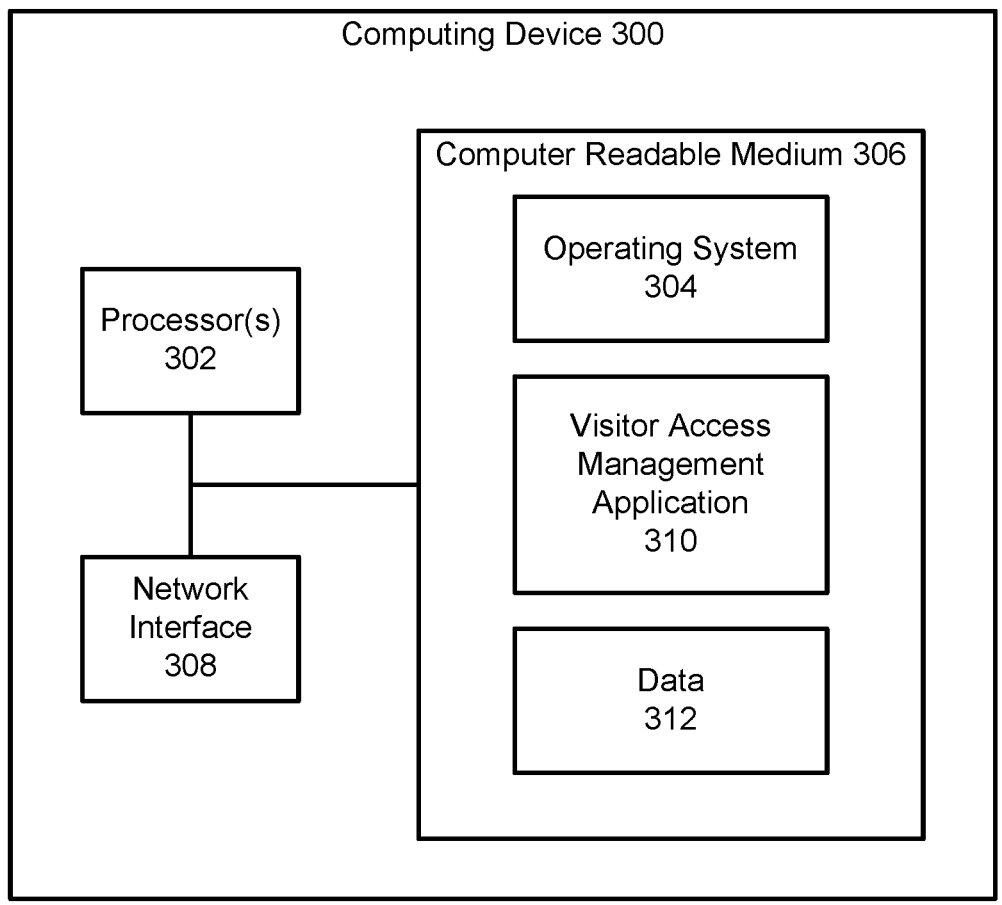
FIG. 3 is a diagram of an example computing device configured for managing access of visitors to a facility and network in accordance with at least one implementation.

FIG. 3 is a diagram of an example computing device 300 in accordance with at least one implementation. The computing device 300 includes one or more processors 302, nontransitory computer readable medium 306 and network interface 308. The computer readable medium 306 can include an operating system 304, an application 310 for managing access of visitors to a facility and a data section 312 (e.g., for storing visitor data, machine readable indicia, physical facility and/or network authentication credentials, etc.).

In operation, the processor 302 may execute the application 310 stored in the computer readable medium 306. The application 310 can include software instructions that, when executed by the processor, cause the processor to perform operations for managing access of visitors to a facility in accordance with the present disclosure (e.g., performing one or more of 202-238 described above).

The application program 310 can operate in conjunction with the data section 312 and the operating system 304.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for managing access of visitors to a facility.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
providing an electronic invitation communication to a visitor device, the electronic invitation communication including a computer readable indicium;
determining physical presence of the visitor device by sensing, at a computer readable indicium sensor system, the computer readable indicium presented by the visitor device;
validating the computer readable indicium;
in response to determination that the computer readable indicium is valid, transmitting an authentication token to the visitor device;
receiving, at a visitor input device, a user input including the authentication token;
in response to determination that the authentication token in the received user input is valid, creating a visitor account by utilizing visitor information associated with the computer readable indicium, wherein the visitor information comprises one or more of visitor name, authentication information, and visitor email to permit the visitor device to automatically connect to a computer network without visitor intervention;
providing a network connection from the computer network to the visitor device;
causing a captive portal landing page that corresponds to a captive portal associated with the computer network to be displayed on the visitor device;
automatically searching for an electronically stored version of the computer readable indicium on the visitor device, wherein the automatically searching is in response to loading and displaying of the captive portal landing page on the visitor device;
in response to determination that the electronically stored version of the computer readable indicium is found on the visitor device, determining, using the captive portal, the visitor information based on the electronically stored version of the computer readable indicium;
performing a login process, using the visitor information, from the captive portal to a policy server to login the visitor device to the computer network; and
upon successfully performing the login process, granting the visitor device access to the computer network upon successful matching of the visitor information associated with the visitor account and based on an authentication policy evaluation.

2. The method of claim 1, wherein the computer readable indicium includes one of a quick response (QR) code, a two-dimensional barcode, and a three-dimensional barcode.

3. The method of claim 1, wherein validating the computer readable indicium includes determining that the computer readable indicium is being sensed at a date and time within a period of validity indicated in the electronic invitation communication.

4. The method of claim 1, wherein the authentication token includes a one time password.

5. The method of claim 1, further comprising:
when the electronically stored version of the computer readable indicium is not found on the visitor device, receiving a manually provided indication of a location of the electronically stored version of the computer readable indicium on the visitor device.

6. The method of claim 1, further comprising:
providing a second level authentication request to the visitor device;
receiving second level authentication information from the visitor device; and
granting access to the computer network based on the second level authentication.

7. The method of claim 1, wherein the captive portal is displayed automatically or in response to a user attempt to access the computer network.

8. The method of claim 1, wherein causing the captive portal landing page that corresponds to the captive portal associated with the computer network to be displayed comprises causing the captive portal landing page that corresponds to the captive portal associated with the computer network to be displayed via a browser on the visitor device.

9. A system comprising:
one or more hardware processors; and
a non-transitory computer readable medium, coupled to the one or more hardware processors, the non-transitory computer readable medium having stored thereon software instructions that, when executed by the one or more hardware processors, cause the one or more hardware processors to perform operations including:
providing an electronic invitation communication to a visitor device, the electronic invitation communication including a computer readable indicium;
determining physical presence of the visitor device by sensing, at a computer readable indicium sensor system, the computer readable indicium presented by the visitor device;
validating the computer readable indicium;
in response to determination that the computer readable indicium is valid, transmitting an authentication token to the visitor device;
receiving, at a visitor input device, a user input including the authentication token;
in response to determination that the authentication token in the received user input is valid, creating a visitor account by utilizing visitor information associated with the computer readable indicium, wherein the visitor information comprises one or more of visitor name, authentication information, and visitor email to permit the visitor device to automatically connect to a computer network without visitor intervention;
providing a network connection from the computer network to the visitor device;
causing a captive portal landing page that corresponds to a captive portal associated with the computer network to be displayed on the visitor device;
automatically searching for an electronically stored version of the computer readable indicium on the visitor device, wherein the automatically searching is in response to loading and displaying of the captive portal landing page on the visitor device;
in response to determination that the electronically stored version of the computer readable indicium is found on the visitor device, determining, using the captive portal, the visitor information based on the electronically stored version of the computer readable indicium;
performing a login process, using the visitor information, from the captive portal to a policy server to login the visitor device to the computer network; and
upon successfully performing the login process, granting the visitor device access to the computer network upon successful matching of the visitor information associated with the visitor account and based on an authentication policy evaluation.

10. The system of claim 9, wherein the computer readable indicium includes one of a quick response (QR) code, a two-dimensional barcode, and a three-dimensional barcode.

11. The system of claim 9, wherein validating the computer readable indicium includes determining that the computer readable indicium is being sensed at a date and time within a period of validity indicated in the electronic invitation communication.

12. The system of claim 9, wherein the authentication token includes a one time password.

13. The system of claim 9, wherein the operations further include:
when the electronically stored version of the computer readable indicium is not found on the visitor device, receiving a manually provided indication of a location of the electronically stored version of the computer readable indicium on the visitor device.

14. The system of claim 9, wherein the operations further include:
providing a second level authentication request to the visitor device;
receiving second level authentication information from the visitor device; and
granting access to the computer network based on the second level authentication.

15. A non-transitory computer readable medium having stored thereon software instructions that, when executed by one or more processors, cause the one or more processors to perform operations including:
providing an electronic invitation communication to a visitor device, the electronic invitation communication including a computer readable indicium;
determining physical presence of the visitor device by sensing, at a computer readable indicium sensor system, the computer readable indicium presented by the visitor device;
validating the computer readable indicium;
in response to determination that the computer readable indicium is valid, transmitting an authentication token to the visitor device;
receiving, at a visitor input device, a user input including the authentication token;
in response to determination that the authentication token in the received user input is valid, creating a visitor account by utilizing visitor information associated with the computer readable indicium, wherein the visitor information comprises one or more of visitor name, authentication information, and visitor email to permit the visitor device to automatically connect to a computer network without visitor intervention;
providing a network connection from the computer network to the visitor device;

causing a captive portal landing page that corresponds to a captive portal associated with the computer network to be displayed on the visitor device;

automatically searching for an electronically stored version of the computer readable indicium on the visitor device, wherein the automatically searching is in response to loading and displaying of the captive portal landing page on the visitor device;

in response to determination that the electronically stored version of the computer readable indicium is found on the visitor device, determining, using the captive portal, the visitor information based on the electronically stored version of the computer readable indicium;

performing a login process, using the visitor information, from the captive portal to a policy server to login the visitor device to the computer network; and upon successfully performing the login process, granting the visitor device access to the computer network upon successful matching of the visitor information associated with the visitor account and based on an authentication policy evaluation.

16. The non-transitory computer readable medium of claim 15, wherein the computer readable indicium includes one of a quick response (QR) code, a two-dimensional barcode, and a three-dimensional barcode.

17. The non-transitory computer readable medium of claim 15, wherein validating the computer readable indicium includes determining that the computer readable indicium is being sensed at a date and time within a period of validity indicated in the electronic invitation communication.

18. The non-transitory computer readable medium of claim 15, wherein the authentication token includes a one time password.

19. The non-transitory computer readable medium of claim 15, wherein the operations further include:
when the electronically stored version of the computer readable indicium is not found on the visitor device, receiving a manually provided indication of a location of the electronically stored version of the computer readable indicium on the visitor device.

20. The non-transitory computer readable medium of claim 15, wherein the operations further include:
providing a second level authentication request to the visitor device;
receiving second level authentication information from the visitor device; and
granting access to the computer network based on the second level authentication.

* * * * *

UNITED STATES PATENT AND TRADEMARK OFFICE
CERTIFICATE OF CORRECTION

PATENT NO. : 10,389,730 B2
APPLICATION NO. : 15/145270
DATED : August 20, 2019
INVENTOR(S) : Atul Prabhu Page 1 of 1

It is certified that error appears in the above-identified patent and that said Letters Patent is hereby corrected as shown below:

In the Claims

Column 11, Line 60, Claim 9 delete "the computer" and insert -- a computer -- therefor.

Signed and Sealed this
Third Day of March, 2020

Andrei Iancu
*Director of the United States Patent and Trademark Office*